UNITED STATES PATENT OFFICE.

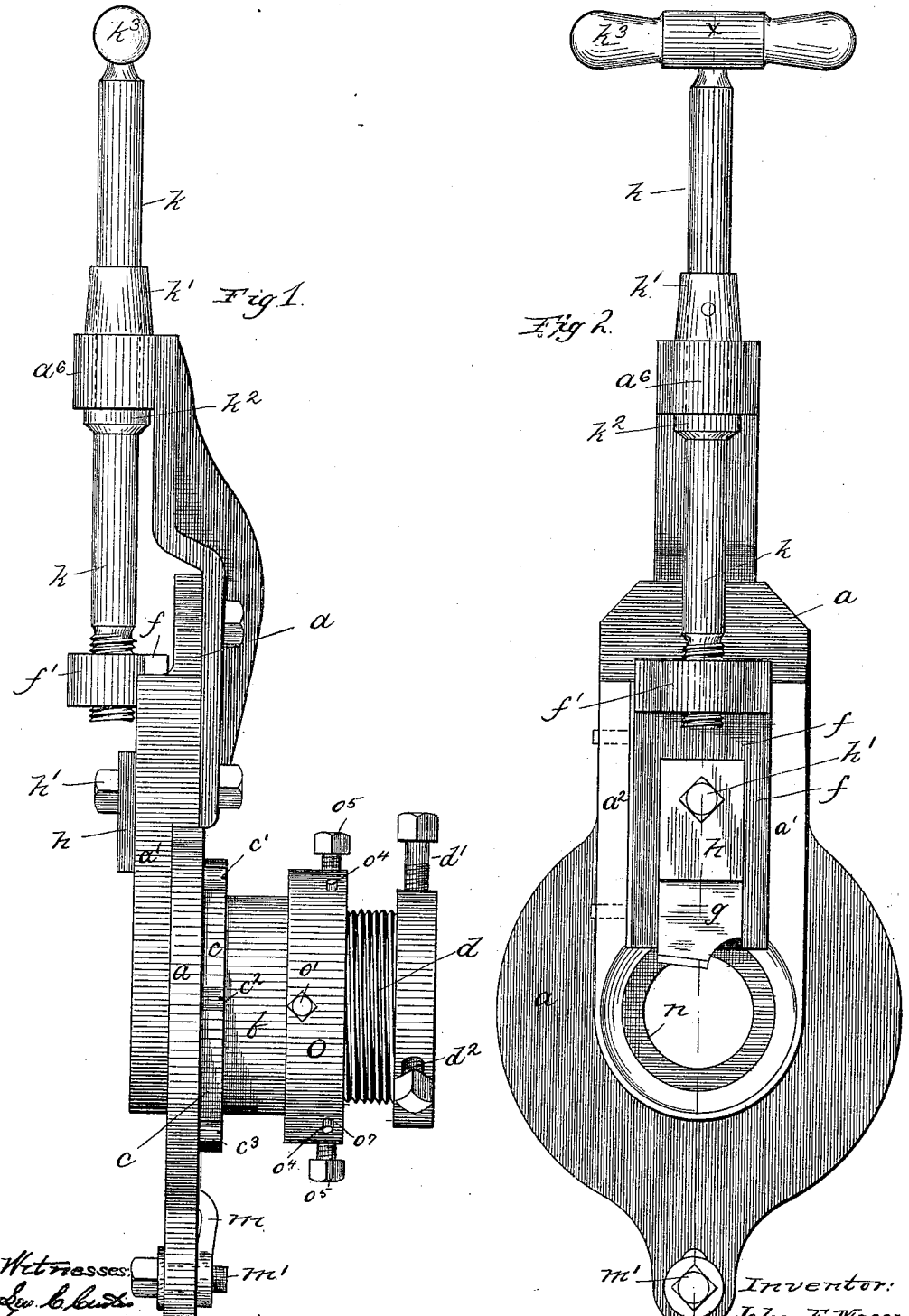

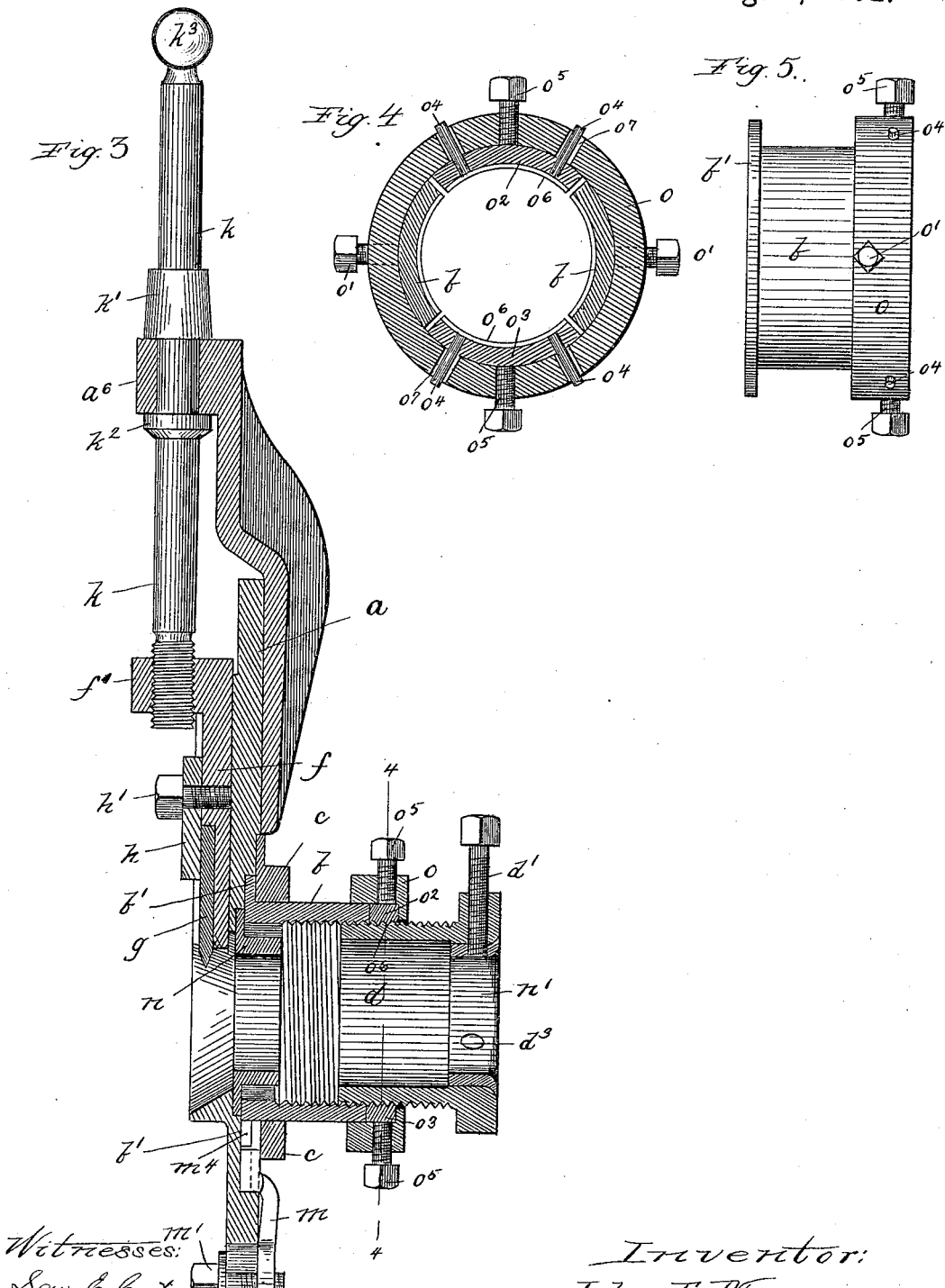

JOHN FRANKLIN MASON, OF DES MOINES, IOWA.

TOOL FOR CUTTING OFF PIPES.

SPECIFICATION forming part of Letters Patent No. 479,892, dated August 2, 1892.

Application filed June 1, 1891. Serial No. 394,798. (No model.)

*To all whom it may concern:*

Be it known that I, JOHN FRANKLIN MASON, a citizen of the United States, residing at Des Moines, in the county of Polk and State of Iowa, have invented a new and useful Tool for Threading and Cutting Off Pipes, of which the following is a specification.

The object of my invention is to provide a convenient portable hand-tool for making nipples and threading and cutting off pipes of any size from the smallest sizes up to six or more inches in diameter.

My invention relates to the class of machines and hand-tools employed in threading pipes and rods and in cutting off pipes; and it consists in a device having means for rotating a thread-cutting tool around a pipe or shaft and advancing it along the shaft as it is rotated to form a thread, and means for regulating the depth of cut of said tool as it advances, and also means for rotating said tool around a pipe or shaft in a plane at right angles to the axis of the pipe for the purpose of cutting off the same.

Figure 1 is a side elevation of my tool. Fig. 2 is a front view, and Fig. 3 is a cross-section taken on the dotted line $x$ $x$ of Fig. 2. Figs. 4 and 5 will be hereinafter referred to and explained.

Like letters refer to like parts in the several figures.

$a$ is the main piece or foundation, to which all the other parts are attached and may be made of cast-iron, malleable iron, or cast-steel.

$b$ is an internally-threaded sleeve secured to $a$ by the cap $c$ in the manner shown in Fig. 3. Cap $c$ is fastened in position by cap-screws $c'$ $c^2$ $c^3$.

$d$ is an externally-threaded sleeve, which screws into the sleeve $b$, as shown in Fig. 3, and has three set-screws, two only being shown, $d'$ and $d^2$. These set-screws radiate from the center of the sleeve at equal distances from each other.

$a'$ and $a^2$ are two guides rising from the main surface of plate $a$ and have their inner surfaces made parallel and inclined forward, so as to receive and retain a sliding carriage $f$.

$f'$ is a boss projecting from the sliding carriage $f$ and is threaded to receive a screw-rod $k$.

$k$ is a shaft having its main bearing in a boss $a^6$, projecting from plate $a$, the free end terminating in a handle $k^3$ and the opposite end secured by a suitable thread in the boss $f'$.

$k'$ and $k^2$ are collars secured to rod $k$ in such manner as effectually to prevent longitudinal movement of the rod with reference to plate $a$.

$g$ is a thread-cutting tool fixed in a recess formed in carriage $f$ and secured therein by a cap $h$ and cap-screw $h'$.

$m$ is a dog or clamp secured to plate $a$ by a thumb-screw $m'$ and extends radially toward the center of the sleeve $b$ through a slot formed in the under side of cap $c$, as shown in section in Fig. 3. A notch is formed in the circumference of the flange $b'$ on sleeve $b$. (Shown at $m^4$, Fig. 3.) By releasing the thumb-nut $m'$ clamp $m$ may slide toward the center of the sleeve and into said slot, and thereby secure sleeve $b$ to the main plate $a$. On the contrary, when clamp $m$ slides out of above slot sleeve $b$ is left free to rotate in its bearing between the main plate $a$ and cap $c$.

$n$ is a collar placed in a recess formed in the main plate $a$ and is secured therein by sleeve $b$ and is concentric therewith.

$n'$ is a collar fitted into sleeve $d$, and has openings which correspond with those in $d$, through which the several set-screws $d'$ $d^2$ $d^3$ pass, and is secured to said sleeve by said set-screws passing into or through said openings.

Figs. 4 and 5 represent, respectively, a side elevation and plan view of a collar employed to securely clamp together the sleeves $b$ and $d$. $o$ is the shell of the collar and is made to fit over sleeve $b$, as shown in Fig. 3 in cross-section, and is firmly fixed thereto by set-screws $o'$. $o^2$ and $o^3$ are segments of arcs, which fit into that portion of the collar that extends beyond the end of sleeve $b$ and are secured in position by cap-screws $o^4$ $o^4$ $o^4$ $o^4$, said cap-screws passing radially through slots $o^7$, formed in the collar. These slots are designed to allow a free but limited radial movement to the segments. The inner surfaces $o^6$ $o^6$ of the segments $o^2$ $o^3$ are threaded to correspond with the threads on sleeve $d$. By means of set-screws $o^5$ $o^5$ these segments may be forced rigidly against the threaded surface of sleeve $d$, thereby securely attaching the two sleeves $b$ and $d$.

The operation of my machine is as follows: First, to thread a pipe select suitable collars to correspond in size with the pipe and place them in the machine, as shown in the drawings. Secure sleeve $b$ to plate $a$ by the clamp $m$ and thumb-nut $m'$, as hereinbefore described. Place the pipe in a vise to secure it from revolving and to support the tool while operating. Place sleeve $n'$ over the end of the pipe and slide the tool on the pipe until the thread-cutting tool $g$ comes to the end of the pipe. Then secure sleeve $d$ to the pipe by the set-screws $d'$ $d^2$ $d^3$ and loosen up set-screws $o^5$ $o^5$ by the handle $k^3$ and rod $k$. Run the carriage $f$ down toward the pipe until the edge $g'$ of the tool extends slightly beyond the outside surface of the pipe. Then by means of the handle $k^3$ rotate the plate around the pipe in such direction as to carry the cutting-tool over and along the body of the pipe. A partial thread will be made as the tool advances. When sufficient length of thread is secured, reverse motion and repeat the operation, advancing the cutting-tool at the beginning of each operation. Nearly all pipes are cut on a taper. To cut such taper with my tool, the operator should gradually withdraw the cutting-tool as it advances on the pipe at each operation after the first or second time. Operating as above a clean smooth thread may be cut with slight labor to the operator even on three and four inch pipe and larger. To cut off a pipe, secure the tool to the pipe, as before described. Then by means of thumb-nut $m'$ and clamp $m$ release sleeve $b$ from plate $a$ and by set-screws $o^5$ $o^5$ clamp the sleeves $b$ and $d$ firmly together. Then turn the plate $a$ around the shaft, gradually advancing the cutting-tool, until the pipe is cut through. To cut a left-hand thread, use sleeves $b$ and $d$ that are left-hand threaded and turn the cutting-tool $g$ over bottom side up and secure it in position, then proceeding as before described in all respects. To cut a nipple, proceed, as before described, to cut the thread on one end and then release sleeve $d$ from the pipe and slide the tool on the pipe until the desired length is secured and again fasten to the pipe. Proceed, as before described, to secure the taper and gradually advance the tool as it approaches the end of the nipple.

From the above description the manner of construction and mode of operation of my tool may be readily understood by one skilled in the class of tools to which this appertains.

What I claim as new and useful, and desire to secure as my invention, is—

1. The combined pipe threading and cutting-off tool consisting in the combination, with a threaded sleeve furnished with a clamping device for attaching it to the pipe, of a second threaded sleeve mounted thereon, a rotating plate, a cutting-tool carried thereby, a clamping device for fixing said rotating plate to said last-mentioned sleeve for cutting threads upon the pipe, and a clamping device for securing said threaded sleeves together in different positions for cutting off the pipe at any point desired, substantially as specified.

2. The combination, with a cutting-tool adapted to cut threads upon and to sever a pipe, of a rotating plate carrying said tool and two threaded sleeves, upon one of which said rotating plate is mounted, said rotating plate revolving on said sleeve in cutting off the pipe and with the sleeve in cutting threads on the pipe, substantially as specified.

3. The combination, with a rotating plate, of a threaded sleeve upon which it is mounted, a second sleeve screw-threaded with the first, a clamp-collar and screw for fixing said sleeves together, a set-screw for fixing said second sleeve to the pipe, a radially-adjustable knife carriage or slide mounted on said rotary plate, a knife or cutting-tool mounted in said carriage or slide, and a clamp for fixing said rotating plate to said first-mentioned sleeve, whereby said tool operates both to thread and to cut off the pipe, substantially as specified.

4. The combination, with rotating plate $a$, of knife carriage or slide $f$, mounted thereon, a screw-shaft for adjusting the same radially, a cutting-tool $g$, carried by said slide, a threaded sleeve $b$, upon which said plate $a$ is journaled, a screw-threaded sleeve $d$, a clamp-collar $o$, fixed to said sleeve $b$ and furnished with radially-movable threaded segment-clamps for engaging the other sleeve $d$, a clamp or set-screw for fixing said sleeve $d$ to the pipe, and a clamp for fixing said plate $a$ to said sleeve $b$, substantially as specified.

5. The combination of two threaded sleeves $b$ $d$ with a clamp-collar fixed to one of said sleeves and furnished with radially-movable threaded clamp-segments, substantially as specified.

6. The combination of two threaded sleeves $b$ $d$ with a clamp-collar fixed to one of said sleeves and furnished with radially-movable threaded clamp-segments and set-screws for operating said clamp-segments, substantially as specified.

7. The combination, with a cutting-tool adapted to cut threads upon and to sever a pipe, of a rotating plate carrying said tool and two threaded sleeves, upon one of which said rotating plate is mounted, said rotating plate revolving on said sleeve in cutting off the pipe and with the sleeve in cutting threads on the pipe, said cutting-tool being secured to a radially-adjustable slide mounted upon said rotary plate, substantially as specified.

8. The combination, with a rotating tool-carrying plate, of two screw-threaded sleeves, one for fixing the implement to a pipe and the other carrying said rotating plate, a clamp device for fixing said plate to said last-mentioned sleeve, and a clamp device for fixing said sleeves together in different positions for cutting off the pipe where desired, substantially as specified.

JOHN FRANKLIN MASON.

Witnesses:
    CHAS. F. MASON,
    J. H. COON.